Figure 1:
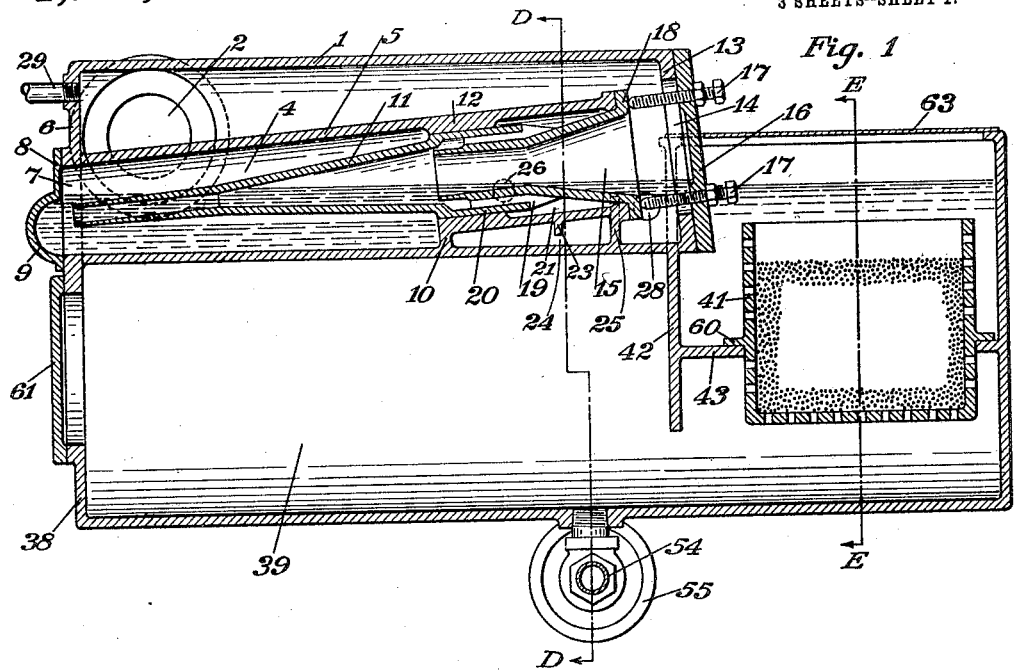

W. P. CAINE.
FEED WATER HEATER.
APPLICATION FILED FEB. 3, 1913.

1,107,409.

Patented Aug. 18, 1914.
3 SHEETS—SHEET 1.

Witnesses
J. W. Cox
homil Nikh

Inventor
W. P. Caine

Attorney

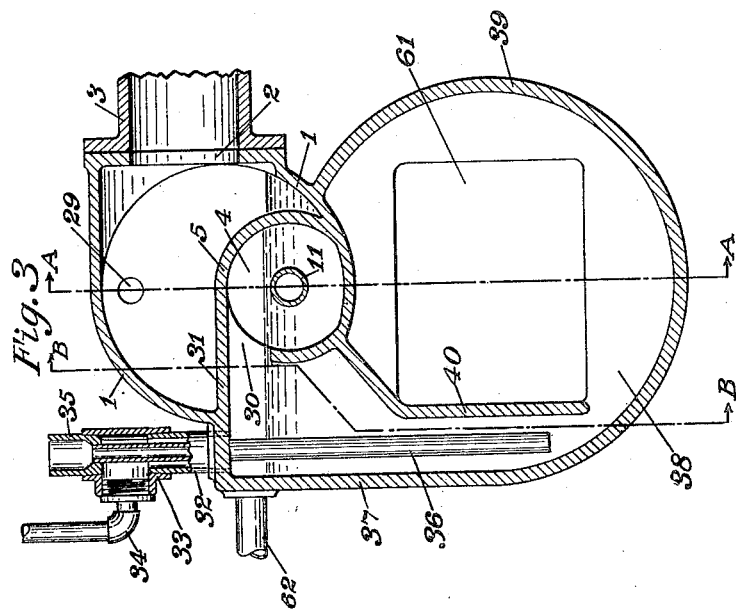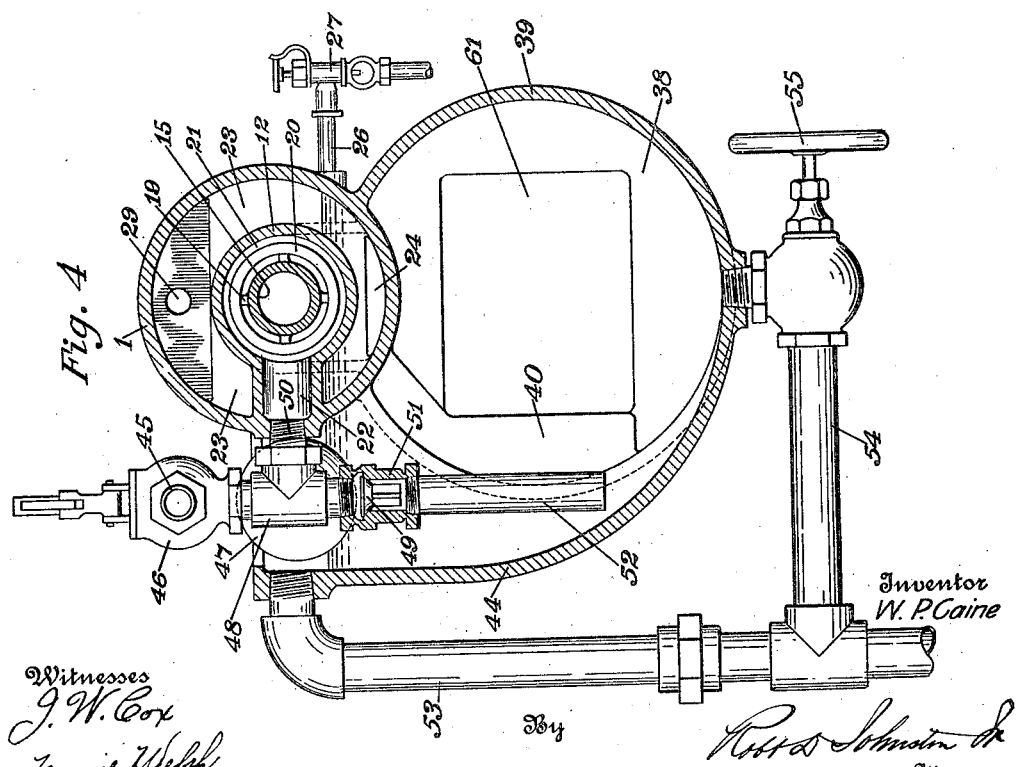

W. P. CAINE.
FEED WATER HEATER.
APPLICATION FILED FEB. 3, 1913.

1,107,409.

Patented Aug. 18, 1914.
3 SHEETS—SHEET 3.

Witnesses
J. W. Cox
homie Welsh

Inventor
W. P. Caine
By
Ross Johnston
Attorney

UNITED STATES PATENT OFFICE.

WILLIAM PHILLIPS CAINE, OF BIRMINGHAM, ALABAMA, ASSIGNOR OF ONE-HALF TO PASCHAL G. SHOOK AND JOHN F. FLETCHER, DOING BUSINESS AS COPARTNERS UNDER THE FIRM-NAME OF SHOOK & FLETCHER, OF BIRMINGHAM, ALABAMA.

FEED-WATER HEATER.

1,107,409. Specification of Letters Patent. Patented Aug. 18, 1914.

Application filed February 3, 1913. Serial No. 745,951.

*To all whom it may concern:*

Be it known that I, WILLIAM P. CAINE, a citizen of the United States of America, residing at Birmingham, in the county of Jefferson and State of Alabama, have invented certain new and useful Improvements in Feed-Water Heaters, of which the following is a specification.

My invention relates to a feed water heating apparatus in which the steam and water are brought into direct contact and which is designed to utilize, to the fullest extent, the heat contained in the steam used to raise the temperature of the feed water.

As the presence of oil is very undesirable in the boilers, it is essential that it be removed from the exhaust steam, cylinder drips and trap discharges that are passed into the heater before it is mixed with the feed water. In removing the oil from the steam it is also necessary to remove all the water of condensation traveling with it. This is accomplished: first, by reducing the velocity by passing the mixture into an enlarged chamber, which reduces the power of the steam to carry any liquid with it: second, by changing the direction of movement of the mixture in the separating chamber so that the inertia of the liquid will throw it against the chamber wall down which it runs into the collecting basin below: third, by then causing the mixture to travel in an upward direction for a considerable distance giving the force of gravity an opportunity to remove whatever water and oil that remains. As a result of these steps, all of the liquid is collected in the bottom of the separating chamber where there is very little flow and agitation, which gives a chance for the oil and water to separate, the oil rising to the surface where it is drawn off as fast as it collects preferably into a small oil filter where it can be purified and used again.

The water in the separating chamber, which has had all scale forming matter removed and is already hot, makes a very valuable addition to the feed water and it is automatically drained out as fast as it collects and is allowed to mix with the feed water. After the oil has been separated from the steam, the steam enters the heater proper which is a jet apparatus, similar to an injector, through which the exhaust steam passes mixing with the cold feed water which condenses it and the resulting hot water passes into a chamber open to the atmosphere through a vent pipe which may be arranged to eliminate or create back pressure if desired.

One very important feature of my heater is that which adapts it to take just enough steam to heat the feed water and no more, leaving the rest of the exhaust steam available for other purposes. This result is obtained by causing the water in the hot water chamber to give a seal of say one inch to the discharge end of the mixing nozzle so that air would be very unlikely to be drawn backward into the steam chamber, and a vacuum will result in the nozzle, due to the condensing of the steam by the cold water, which will induce a flow of steam toward the heater when it is in service and stop it when the cold water is shut off.

A further object of my invention is to provide a settling tank into which the hot water from the heater flows and from which it is drawn off through an easily detachable filter or through a by-pass which will take the water from below the filter when the water level falls abnormally low. This tank affords the heated water an opportunity to deposit most of the impurities therein as it is caused to move very slowly the full length of the tank. Further, it makes it possible for me to provide means to produce a circulation of water from the tank back into the heater. This circulation is important to raise and maintain the water in the tank at the highest possible temperature. By my invention, if the water in the tank is not heated to a temperature very close to the maximum, the steam flowing into the heater will automatically start a circulation of water from the tank through the heater and back to the tank which will continue until the temperature of the tank water is high enough to flash into steam in the circulation passage under the pressure conditions existing therein and thus interrupt the circulation of water, it being evident that the suction effect of the nozzle will tend to reduce the pressure of the circulating water in the return circulating passage only.

I arrange the settling tank so that all impurities which are mechanically mixed with the water are separated out in such manner that the water in flowing to the outlets does not have to pass through such impurities. Further, my apparatus is particularly adapted for the treatment of the feed water by chemicals in the most effective manner. As chemical action is much more rapid in the presence of heat, I introduce the chemical into the water as it flows from the heater into the settling tank. The latter may be elongated sufficiently to insure the removal of most of the precipitates formed before the water passes into the filter.

My invention involves many details of construction and arrangements of parts which are hereinafter more particularly described and claimed, reference being had to the accompanying drawings which form a part of this specification, and in which:—

Figure 2:
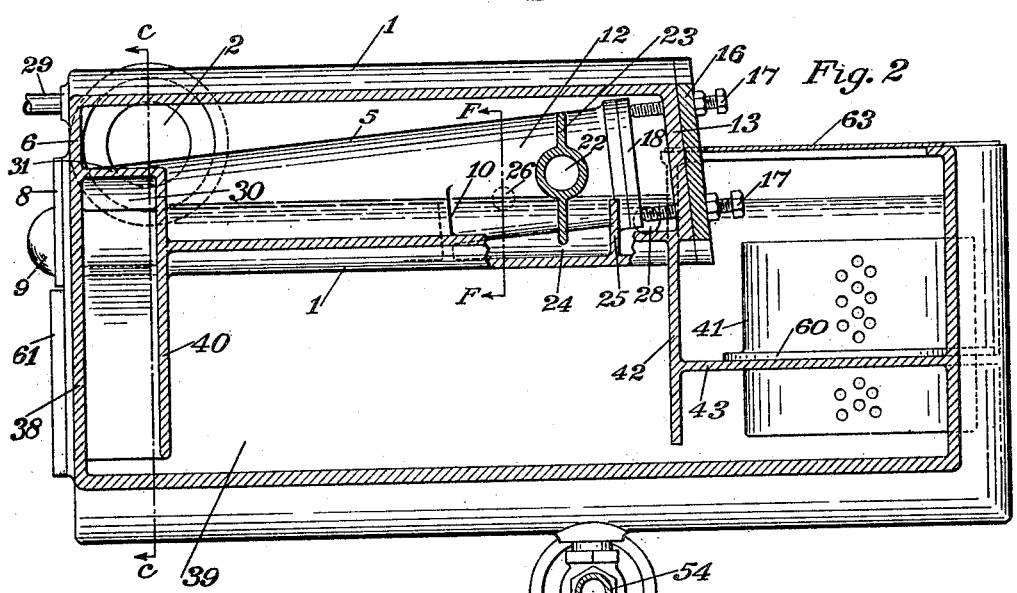
Figure 7:
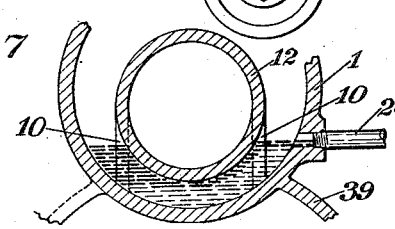
Figure 5:
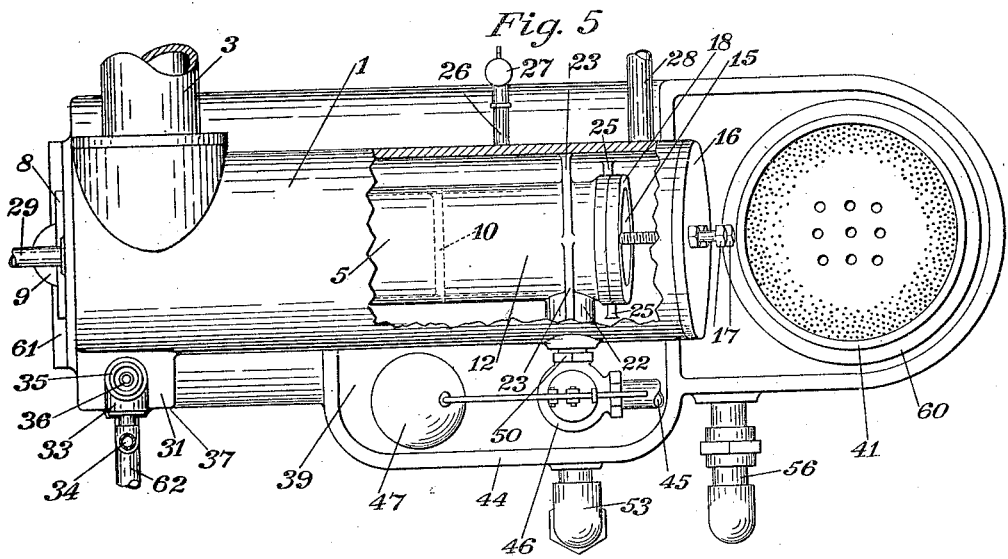
Figure 6:
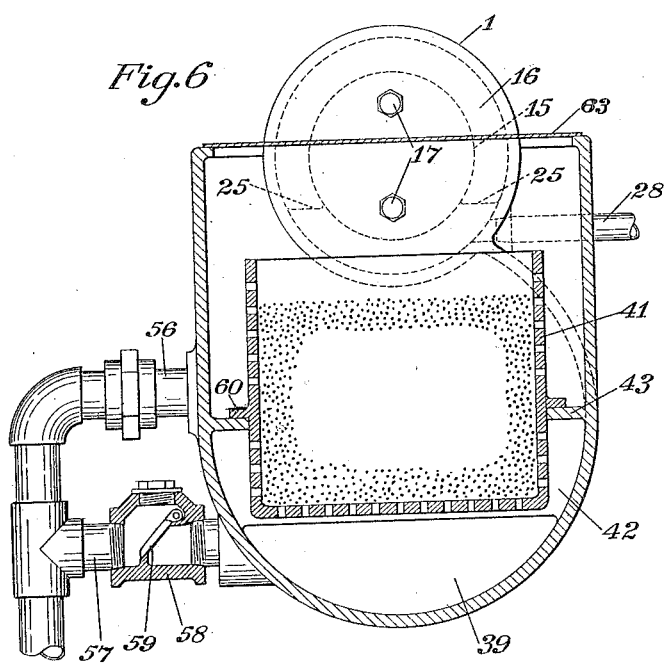

Figure 1 is a longitudinal vertical sectional view taken on the line A—A of Fig. 3. Fig. 2 is a similar sectional view taken on the line B—B of Fig. 3 with the outer casing partly broken away. Fig. 3 is a cross-sectional view taken on the line C—C of Fig. 2 with filter cover removed. Fig. 4 is a cross-sectional view taken on the line D—D of Fig. 1. Fig. 5 is a top plan view of the apparatus partly broken away. Fig. 6 is a vertical cross-sectional view taken on the line E—E of Fig. 1. Fig. 7 is a partial cross-sectional view taken on the line F—F of Fig. 2, omitting the injector parts.

Similar reference numerals refer to similar parts throughout the drawings.

In the preferred embodiment of my invention illustrated in the drawings, I show a feed water heater comprising a horizontal cylindrical casing 1 having a steam admission port 2, disposed at one side and near one end thereof. Steam is delivered to this port by a pipe 3. The casing 1 contains an internal hot water chamber 4 formed preferably by an integral partition wall 5 which is curved over the top and has parallel sides which extend down to and merge into the bottom wall of the casing 1. The partition extends from the end wall 6 of the casing 1, surrounding an opening 7 in the wall 6 which is covered by a plate 8 cast with a semi-globular recess 9. The chamber 4 is closed at its inner end by a transverse wall 10 which is provided with a circular opening to receive the combining tube 11. The partition wall 5 has an integral extension forming a jacket 12 which is circular in cross section and is spaced from the bottom of the casing. This jacket is left open at its end adjacent to the end wall 13 of the casing 1 and this latter wall is provided with an opening 14 sufficiently large to permit of the insertion into the open end of the jacket of the steam nozzle 15. A plate 16 is attached to casing 1 to close the opening 14 and it carries set screws 17 which are adapted to engage the peripheral flange 18 surrounding the intake end of the steam nozzle 15 and press it with a steam tight fit against the faced end of jacket 12, to close same. The nozzle 15 converges to a point near its center from which its internal diameter expands slightly toward its discharge end which is disposed within and concentric with, the combining tube 11. The discharge end of nozzle 15 is provided with a series of spacer ribs 19 which center the said nozzle 15 in the end 20 of the tube 11 which abuts against stop shoulders on said ribs. This arrangement holds the discharge end of nozzle 15, which is externally reduced, as seen in Fig. 1, spaced from the inner wall of the intake end of tube 11, and this annular space is the connection between the combining tube 11 and the cold water chamber 21 which is formed between the nozzle 15 and the jacket 12 and is supplied with cold water through a passage 22 which is preferably formed in a transverse partition wall 23 which extends from the jacket on each side to the casing 1, leaving a passage 24 (Fig. 4) below it and having its top wall spaced from the top of casing 1. A second transverse partition 25 passes under the jacket 12 and connects with the bottom of the casing 1, the partition at each side of the jacket rising to a point which will bring the level of the fluid in the casing 1, surrounding the jacket, slightly above the intake end of the nozzle 15. It will be noted by reference to Fig. 2 that the top curved wall of the partition 5 and the jacket 12 are disposed at an incline which rises gradually from the steam admission end of the casing 1. The steam, with its oil and condensed water, enters and expands in the casing 1, changing its direction of flow therein and steam passing over the partition 23 before entering the nozzle 15. Meanwhile the water of condensation and the oil will accumulate in the casing 1 on each side of the hot water chamber wall 5 as indicated in Fig. 7. The oil, collecting on top of the water, will stand at the level fixed by the partition 25 and will be drained off from casing 1 by means of a pipe 26 which deliveres it to a drip cock 27. Inasmuch as I provide the oil outlet on one side only of the jacket 12, it will be obvious that a greater body of oil will accumulate on one side of the jacket than on the other, as seen by reference to Fig. 7, and this larger body of oil accumulates until it works under the jacket 12 to the drain, being prevented from passing forward under the jacket by the partition wall 23. The water of condensation however passes under partition 23 through the passage-way 24 until it overflows wall 25 and accumulates in the end of the casing 1 into which the nozzle 15 opens. In case it is desired to draw off this water of condensation instead of permitting it to mingle with the steam and flow into nozzle 15, I provide a draw off pipe 28. When desired trap discharges containing oil can be introduced into the heater through a pipe 29 and the oil and water separated therein in the manner described.

The combining tube 11 inclines downwardly into the hot water chamber 4 where the water level therein is maintained at a point sufficient to give a water seal. The discharge end of the tube is disposed opposite the globular recess 9 in the plate 7 so that the jet of hot water is brought sufficiently to rest to maintain the water seal in the chamber 4 from which it overflows through a port 30 formed in the side wall of the chamber 4 on the opposite side from the steam inlet 2 and having its bottom edge level with the top of wall 25. This port is relatively narrow and is closed overhead by a wall 31 which extends from the side wall of the hot water chamber out beyond the side wall of the casing 1. A pipe 32 leads from this top wall and connects to a T-fitting 33, from which a vent pipe 34 opens to the atmosphere. A chemical receiving cup 35 is screwed into the top opening of the fitting 33 and supports centrally therein a pipe 36 which extends downwardly into the hot water passage-way formed between the outer side wall 37 and the end wall 38 of the settling tank 39 on two sides and the angular wall 40, on the other two sides, which wall 40 leads from the bottom of the casing 1 to a point near the bottom of the settling tank 39.

It will be noted that the construction described provides for the discharge of hot water from the heater into the settling tank 39 at one end thereof and in a manner to cause a minimum of disturbance to the water in the tank. It will be noted that the water enters flowing tangentially crosswise of the tank and from its entering point, as seen in Figs. 1 and 2, the water flows slowly and gradually toward the other end of the tank which contains the filter 41. The upper end of the heater is supported centrally over the settling tank by a transverse partition wall 42, which wall extends from the top of the tank about the heater and down to a point near the bottom of the settling tank and separates the filter compartment from the main body of the tank. A transverse horizontal partition 43 extends from this wall 42 to the curved end wall of the filter compartment and is provided with a circular opening in which the filter is seated.

The settling tank is preferably covered except over a side extension 44 in which I mount the means for controlling the supply of water to the heater. Under certain conditions it may be desirable to cover the tank entirely, as where live steam is used or where it is desired to maintain a back pressure on the exhaust steam for heating systems. The cold water is delivered by a pipe 45 to a globe valve 46 which is automatically controlled by a float 47. This float rides on the water in the settling tank. The water admitted by the valve 46 flows into a T-fitting 48, the bottom branch of which is normally closed by a check valve 49, and the side branch of which is connected by a threaded nipple 50 with the water passage 22. The check valve 49 is seated in a valve casing 51 which is screwed to the fitting 48 and has a bottom opening threaded to receive the circulation pipe 52 (Fig. 4). This pipe extends to a point near the bottom of the settling tank. I provide an overflow pipe 53 leading from the top of the float chamber and connecting below with the clean-out pipe 54 which leads from the bottom of the tank 39 and is normally closed by valve 55.

The means for drawing off the hot water comprise an upper pipe 56 (Fig. 6) which enters the filter compartment above the partition 43. I provide a second water outlet pipe 57 which leads from the tank below the partition 43 and in this pipe 57 I provide a valve casing 58 in which I mount a valve 59 which is normally seated when the water level is above pipe 56 but which, when the level drops below partition 43, opens automatically due to the absence of pressure above it and the head of water under it so that the water flowing therethrough water seals the pipe line leading to the pump and permits the pump to draw unfiltered water direct from the settling tank. The filter is an open topped vessel with perforated bottom and sides which is filled with any suitable filtering material and set down into the opening in partition 43. The filter has a flange 60 which is disposed around it at an intermediate point and which, by engaging partition 43, supports the filter in operating position and permits it to be easily lifted out for repairs, cleaning, or exchange. The filter compartment is provided with a removable cover plate 63.

The end wall 38 of the settling tank has an opening therein which is closed by a removable plate 61 to give convenient access to the tank for cleaning. A pipe 62 enters the upper end of the hot water passage leading from the chamber 4 into the settling tank and through this pipe hot water from other sources may be introduced and fed through the settling tank into the boilers.

The operation of the heater proper may be briefly described as follows: The steam entering through the side port 2 has its flow arrested and moves slowly lengthwise of the casing 1 and enters steam nozzle 15 which discharges it as a jet into the combining tube 11. The jet of steam acts with injector action to draw in cold water from the water chamber 21 and this water condenses the steam and the resulting hot water is discharged through the end of the tube 11 into the pocket 9, where its flow is arrested and it overflows through the port 30 and enters one end of the settling tank 39. The water level in the hot water tank 4 is maintained high enough to make a water seal on the discharge end of the tube 11 which prevents air from entering the injector, it being noted that the hot water chamber 4 has an air vent to the atmosphere. The hot water introduced at one end of the settling tank works slowly lengthwise of the tank, depositing the impurities that are mechanically mixed therein in the bottom of tank 39 and having all scum and lighter impurities collected on its surface. When the water reaches the wall 42 it passes under the same and flows up through the filter 41 to the normal outlet 56, but in the event that its level falls below this outlet, the valve 59 opens in the manner hereinbefore described and permits the pump to draw water from the bottom of the tank. When normal water conditions obtain above and below the filter, the head of water above the valve 59 holds it seated but as the water level above the filter falls, the lowering of the head of water above the valve coupled with the suction action of the pump, causes the valve to open. The scum and other surface matter which collects in the tank 39 can be readily flushed out by holding the cold water inlet valve open until the rapid inflow of water raises the water level so that it overflows through pipe 53.

It will be noted that the hot water as it moves to a point of discharge from the tank 39 is not caused to pass through any part of the tank where the impurities are collected, as is the general practice, but on the contrary as the water approaches the underpass below the partition 42, it is freed of its floating surface impurities and has deposited the larger percentage of the heavier foreign matter contained in it. The level of the water in the settling tank is automatically maintained by means of the float 47 controlling supply valve 46.

The automatic circulation of water from the settling tank to the heater is obtained by the provision of the pipe 52 and the check valve 49, the operation being as follows: When the cold water is flowing at full pressure through the valve 46 and pipe 22, the check valve 49 is held closed by the pressure of the water, but when this supply of water and consequently its pressure is reduced, the vacuum caused by the condensation of steam in the injector takes effect above valve 49 thereby unbalancing it and causing it to open automatically, permitting water to be drawn up through the pipe 52 and to flow through the casing 51 and fitting 48 into the water chamber 21 and thence into the injector, and this flow will continue until the temperature of the water in the tank 39 rises to a point at which it will flash into steam in the pipe 52, thereby interrupting the circulation. When it is desired to treat the water with a chemical purifying agent, this is introduced through the pipe 36 and takes effect in the settling tank 39. The filter compartment is accessible for ready inspection and permits the filter to be lifted out and changed with minimum trouble.

In accordance with the requirements of law, I have described what I consider the preferred embodiment of my invention, but it is understood that the details of construction may be modified without departing from the principles underlying my invention.

Having thus described my invention, what I claim as new and desire to secure by Letters Patent, is:—

1. In a feed water heater operating on the injector principle, a steam injector, means to supply water to be heated and steam to said injector, a hot water chamber into which said injector discharges, means to water seal the discharge end of said injector, there being an overflow port in said chamber for drawing off the surplus hot water from said chamber, and a settling tank to receive the hot water discharged from said injector, substantially as described.

2. In a feed water heater, a steam injector, means to supply steam to said injector, a water supply chamber which delivers water to mix with the steam in said injector, means to separate the condensed water and oil from said steam before it enters said injector, means to separate the condensed water from the oil and permit the excess water to flow with the steam into the injector, and a hot water chamber into which said injector discharges and in which the water level is maintained above the discharge end of said injector to water seal it, substantially as described.

3. In combination, a feed water heater comprising means to bring steam into direct contact with water to be heated, a tank to receive the hot water resulting from the mingled water and steam in the heater, and means to automatically cause a return circulation of water from said tank to the heater under predetermined conditions, substantially as described.

4. The combination with a feed water heater comprising an injector, means to deliver steam and cold water for mixture therein, and means to water seal the discharge end of said injector, of a settling tank to receive the hot water discharged from the heater, a return circulation pipe, which connects said tank with the water supply means for the injector, and automatically operating means which opens said pipe and permits a circulation of water from tank to heater, substantially as described.

5. In a feed water heater, an injector, means to deliver water to be heated and steam to said injector for mixture therein, a hot water chamber into which said injector discharges, said chamber having a water outlet port and a vent to the atmosphere, and means to maintain a water level in said chamber which seals the discharge end of said injector.

6. In combination, a feed water heater comprising a separating chamber to which steam is admitted, an injector therein, means to supply water and steam to said injector, and a hot water chamber into which said injector discharges, a settling tank into which water from said hot water chamber flows, and means to regulate the supply of water to said injector.

7. In a feed water heater, an elongated oil and water separating chamber, an oil discharge pipe leading therefrom, means to deliver the steam thereinto, a hot water chamber communicating with the oil separating chamber, means to permit only the water collected in said separating chamber entering said hot water chamber, means to mingle water with the steam in said heater, and a settling tank into which the heated water flows from said hot water chamber and from which it is drawn off for use, substantially as described.

8. In a feed water heater, a separating chamber, means to introduce steam thereinto, an injector which opens into said chamber at one end thereof, baffles in said chamber to collect and separate the oil and water in said chamber and permit access of the latter only to said injector, and means to draw off the oil as it collects in said chamber.

9. In a feed water heater, a steam injector, a hot water chamber surrounding the discharge end of said injector, a cold water supply chamber surrounding the intake end of the injector, a steam chamber inclosing said chambers and injector, means to supply steam to said chamber, and means to separate oil and water from the steam as it flows to the injector through said chamber.

10. In a feed water heater, a chamber to which steam is supplied, an injector in the chamber, a hot water chamber which incloses the discharge end of said injector, a main transverse partition near the intake end of said injector over which the steam passes to the injector, said partition having a bottom opening for the water accompanying the steam, a second partition to maintain the water level above the top of said bottom opening in said main partition, and a drain pipe to draw off oil which collects on the side of said main partition away from the injector's steam inlet, substantially as described.

11. In a feed water heater, a steam injector, a hot water chamber surrounding the discharge end only of said injector, a cold water supply chamber surrounding the intake end of the injector, a steam chamber inclosing said chambers and injector, means to supply steam to said chamber, means to separate oil and water from the steam as it flows through said chamber, and separate pipes adapted to draw off the oil and water from said steam chamber.

12. In a feed water heater, an injector, means to supply steam and water to said injector, means to separate the water and oil from the steam, and means to deliver the water thus separated from the steam into the steam admission port of the injector.

13. In a feed water heater, an elongated chamber, means to deliver steam thereinto, an injector therein having its steam intake end arranged so that the steam traverses the length of the chamber before entering it, a baffle over which the steam must flow in traversing the chamber and under which the water separated from the steam passes, a second baffle over which said water flows before entering the injector, cold and hot water chambers surrounding the injector and communicating therewith, and water pipes which connect with said water chambers, as and for the purposes described.

14. A feed water heater comprising an oil separating chamber, means to introduce the steam into one end thereof, an injector disposed therein with its steam intake end near the other end of said chamber which is provided with an opening through which said injector may be inserted, a closure for said opening, and a cold water supply chamber into which said injector fits, and a hot water chamber into which the mixing end of the injector discharges, substantially as described.

15. In a feed water heater, an elongated steam chamber having a steam inlet port, an internal partition in the steam chamber which forms a hot water chamber therein having a hot water outlet port, an inclined injector having its steam inlet end near an end of the steam chamber and having its discharge end in said hot water chamber, means to supply water to be heated to said injector, and means to separate and draw off the oil and water collected from the steam in said steam chamber.

16. In combination, a feed water heater comprising an injector therein, a hot water chamber into which said injector discharges, means to deliver steam to said injector, a valve controlled pipe adapted to deliver water into said injector, a settling tank, means to deliver hot water from said hot water chamber into said tank, means responsive to the water level in said tank which controls the flow of water through said pipe, a water circulation passage which leads from the settling tank into the injector, and a check valve in said circulation passage which automatically opens and permits water to flow from the tank into the injector under predetermined conditions.

17. In combination with a water heater, a settling tank having one end thereof divided by a transverse vertical partition to form a filter compartment which communicates with the tank proper, a filter, means to draw off water from said tank which comprises two pump connections, one from said filter compartment, and one from the settling tank and a normally closed valve in the latter connection to be opened only when the water level falls below the intake end of the former pipe.

18. The combination with a feed water heater, of a settling tank into which the heated water is delivered from the heater, a vertical partition in the tank, a filter disposed horizontally across a portion of the tank divided off by the partition, said tank having two water outlet ports, one opening into the filtered water compartment above the filter and the other into the tank below the filter, an outlet pipe for each of said ports and a common suction pipe into which said pipes lead, and a valve interposed in the lower outlet pipe, which valve is normally seated to close said lower pipe and is adapted to move responsive to the difference in heads of water in the compartments of the filtered and unfiltered water and is adapted to open and permit the flow of water through the lower pipe when the level of the filtered water falls abnormally low.

19. In combination with a water heater, a settling tank having at one end thereof a filter compartment which communicates with the tank proper, a filter and two pump connections, one leading from the tank below the filter compartment and the other from the filter compartment, and an automatic valve in former connection which is normally closed when the pump connection to the filter compartment is submerged and which is adapted to open automatically when the water level in the filter compartment falls below the pipe connection thereinto, substantially as described.

In testimony whereof I affix my signature in presence of two witnesses.

WILLIAM PHILLIPS CAINE.

Witnesses:
NOMIE WELSH,
R. D. JOHNSTON, Jr.

---

Copies of this patent may be obtained for five cents each, by addressing the "Commissioner of Patents, Washington, D. C."